Oct. 28, 1952 E. M. CROSLAND ET AL 2,615,404
DOUGH MOLDING AND DOUGH SHEETING MATERIAL
Filed Feb. 13, 1948 2 SHEETS—SHEET 2

INVENTORS
EDWARD MILNER CROSLAND
AND JOSEPH FRANCIS NAYLOR
BY
S. Victor Armstrong
Atty Patented Oct. 28, 1952

2,615,404

UNITED STATES PATENT OFFICE 2,615,404

DOUGH MOLDING AND DOUGH SHEETING MATERIAL

Edward Milner Crosland, Culcheth, near Warrington, and Joseph Francis Naylor, Newton-le-Willows, England, assignors to T. & T. Vicars Limited, Earlestown, Newton-le-Willows, England Application February 13, 1948, Serial No. 8,228
In Great Britain October 29, 1943

Section 1, Public Law 690, August 8, 1946
Patent expires October 29, 1963

1 Claim. (Cl. 107—12)

1

The present invention relates to improvements in machinery for the manufacture of sheets of dough.

Machines of this character are used in the rubber, bread and biscuit industries. In British Patent Specification No. 341,686 three rollers are provided forming a cylindrically sided compression space, one of the rollers being set slightly out of contact with the others so that a sheet of dough is fed from the machine, whilst another roller can be raised to be out of co-operation with the other two to allow the machine to act as a gauging machine.

According to the present invention a combined dough sheeting and sheet gauging machine comprises three rollers mounted on parallel axes to enclose a cylindrically sided compression space or chamber, means being provided to displace one of the rollers from a position in which the horizontal plane through its axis lies intermediate the horizontal planes through the axes of the other two rollers to a position in which the horizontal plane through its axis lies below the horizontal plane through the axis of the lower of the other two rollers.

Figure 1:
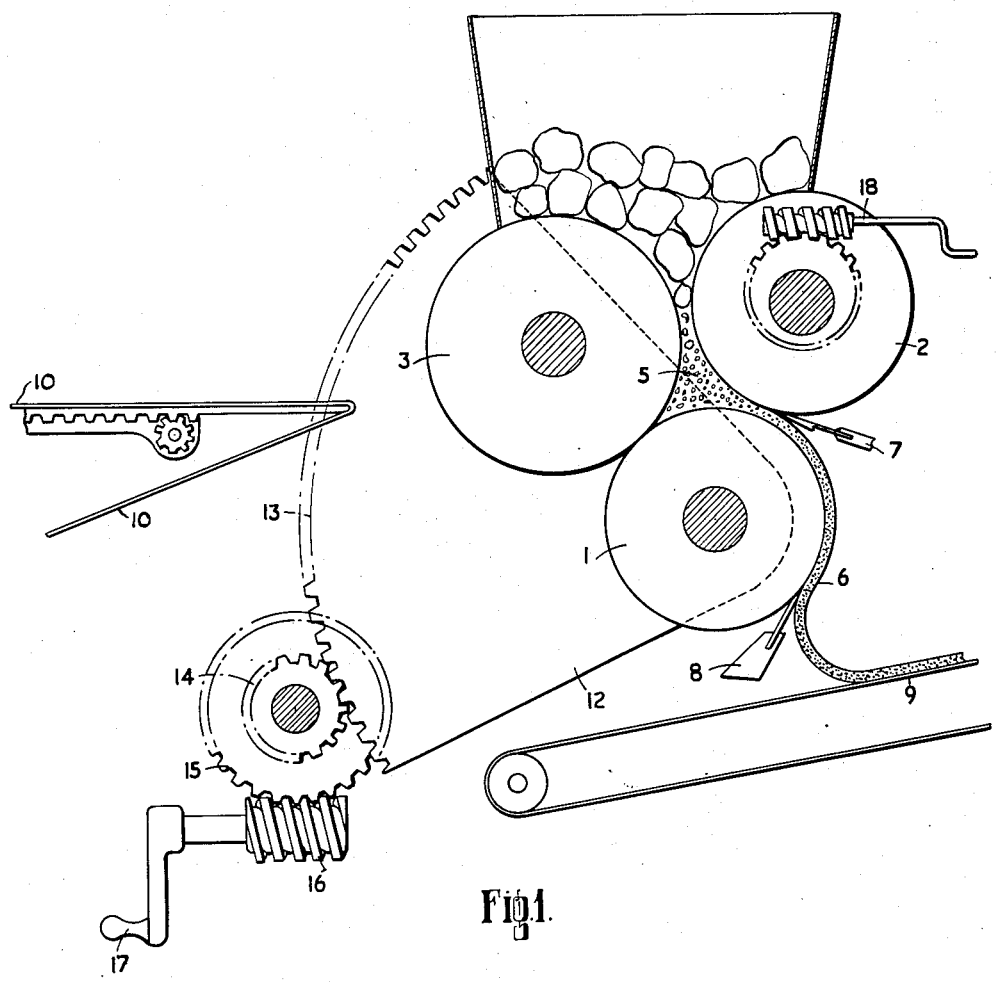
Figure 2:
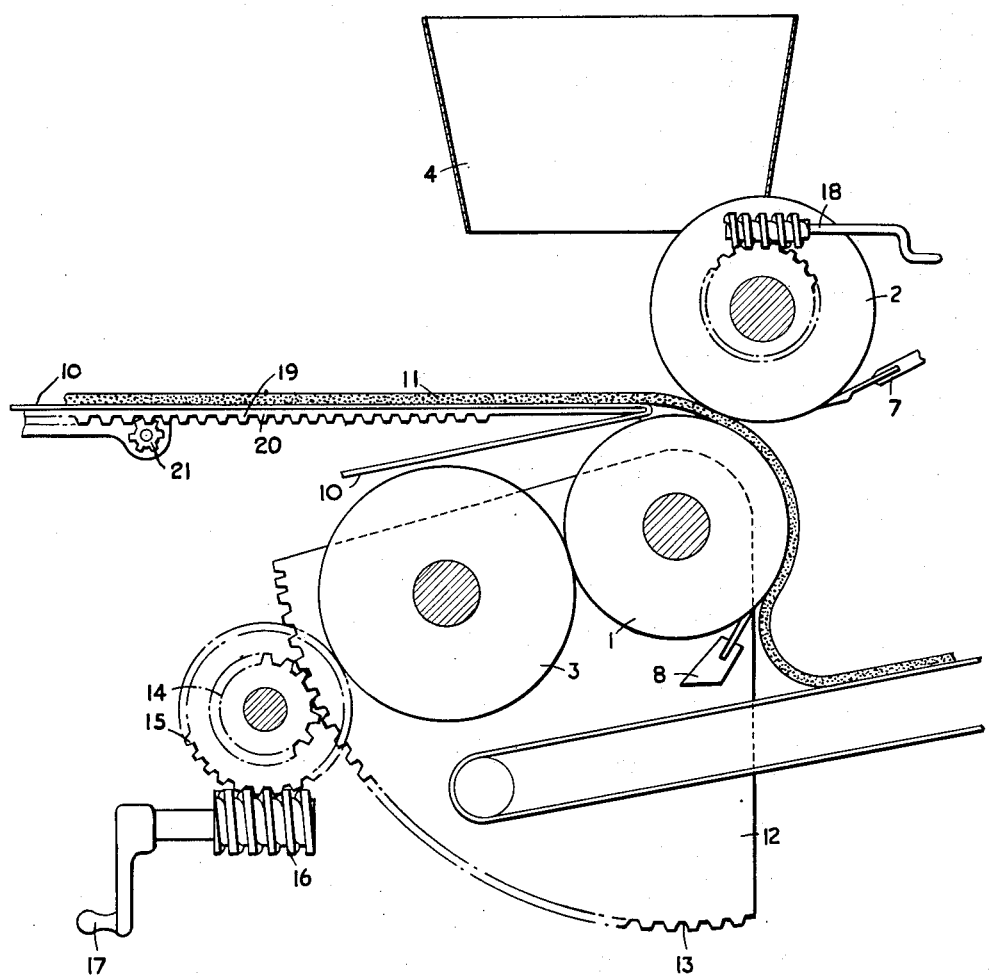

One form of construction according to the invention is described with reference to the accompanying drawings, in which:

Figure 1 is a diagrammatic sectional elevation of one form of construction with the rolls in one position where the machine operates as a dough sheeting device, Figure 2 is a corresponding view with the parts in another position where the machine is operating as a sheet gauging machine.

The machine comprises a lower roller 1, an upper roller 2 and a side roller 3, the side roller 3 being in contact with the lower roller 1 whilst the roller 2 is at a small spaced distance from the roller 3, this distance being usually adjustable. In this position of the rolls dough fed to a hopper 4 passes to a compression space or chamber 5 between the rolls 1, 2, 3 which space is of truncated spherical triangular cross-section and from which dough passes outwards in the form of a continuous sheet 6, being scraped from rolls 2, 3, by scrapers 7, 8, and being received upon a conveyor 9 to be transferred to a dough cutting or other machine. In this position the axes of the three rolls 1, 2, 3, respectively lie at the apices of an acute angled triangle.

The roller 3 is mounted in trunnion bearings on a frame 12, which frame 12 can swing about the axis of the roller 1 by means of a segmental rack 13 on one edge engaging with a pinion 14

2 adapted to be rotated through worm and worm wheel gear 15, 16 by an operating handle 17. The roller 3, therefore, is maintained in contact with the roller 1.

When the roller 3 has been displaced by operation of the hand crank 17 from the position shown in Figure 1 to that of Figure 2, then the axes of the rollers 1, 2, 3, respectively will lie at the apices of an obtuse angled triangle.

The lapped back end of a feed web 10 for a web of dough to be reduced in thickness, or for separate sheets of dough, usually slightly overlapped, to be formed into a continuous gauged sheet can then be moved into position above the roller 3 by a rack and pinion gear displacement of its support as hereinafter described to feed such web or sheets of dough to the bight of the rolls 1, 2, which then acts as a sheet gauging machine as shown in Figure 2, where a sheet of dough such as 11 is reduced in thickness by passage through the rolls 1, 2, as shown.

Either the roll 1 or the roll 2 (preferably the latter) is adjustable, for instance by being mounted in eccentric bearings, rotatably mounted upon the frame of the machine (not shown) and provided with a gear meshing with a worm connected to the operating crank handle 18, to vary the gap between these rolls, so that the thickness of sheet extruded from them can be adjusted.

By displacing the roller 3 with its axis lying below the axis of the roller 1, the top of the machine is left clear when the machine is being used to reduce the thickness of a web of dough, that is to say in gauging, and the sheet to be gauged is fully visible right up to the bight of the rollers 1, 2.

The usual dough supporting continuously moving web 10 is conveniently carried over the end of an extending plate 19 which can be displaced to and fro in a horizontal plane by any conveying means, such as by means of the rack bar 20 and pinion 21, the shaft of which pinion can be provided with a hand crank or the like.

We declare that what we claim is:

A machine for manufacturing sheets of dough comprising, in combination, first, second and third rollers mounted on parallel, horizontal axes to enclose a cylindrically sided compression chamber, means to move the axis of said first roller through a circular path having as its center the axis of said second roller from a position in which the rollers are arranged to provide said compression chamber, said chamber having an inlet between said first and third rollers and an outlet between said second and third rollers, to a position in which a horizontal plane tangent to the upper periphery of said first roller lies below a horizontal plane tangent to the upper periphery of the lower of the other two rollers, the peripheries of said first and second rollers being in contact at all times, means to feed a dough sheet horizontally into the bight between said second and third rollers when said first roller is displaced to its lower position, and means to displace said feeding means horizontally from a position clear of said first roller, when the latter roller is cooperating with the other two rollers to enclose said cylindrically side compression chamber, to a position above said first roller when the latter is in its displaced position.

EDWARD MILNER CROSLAND.
JOSEPH FRANCIS NAYLOR.

REFERENCES CITED

The following references are of record in the file of this patent:

UNITED STATES PATENTS

| Number | Name | Date |
|---|---|---|
| 1,830,426 | Crosland | Nov. 3, 1931 |

FOREIGN PATENTS

| Number | Country | Date |
|---|---|---|
| 417,852 | Great Britain | Oct. 15, 1934 |